United States Patent
Krishnan et al.

(10) Patent No.: US 8,848,799 B2
(45) Date of Patent: Sep. 30, 2014

(54) UTILIZING THRESHOLDS AND EARLY TERMINATION TO ACHIEVE FAST MOTION ESTIMATION IN A VIDEO ENCODER

(75) Inventors: Rathish Krishnan, San Mateo, CA (US); Milan Mehta, Newark, CA (US)

(73) Assignee: Sony Computer Entertainment Inc., Tokyo (JP)

(*) Notice: Subject to any disclaimer, the term of this patent is extended or adjusted under 35 U.S.C. 154(b) by 1131 days.

(21) Appl. No.: 12/553,075

(22) Filed: Sep. 2, 2009

(65) Prior Publication Data
US 2011/0051813 A1 Mar. 3, 2011

(51) Int. Cl.
*H04N 11/02* (2006.01)
*H04N 19/61* (2014.01)
*H04N 19/557* (2014.01)

(52) U.S. Cl.
CPC .......... *H04N 7/26835* (2013.01); *H04N 7/50* (2013.01)
USPC .................................................. 375/240.18

(58) Field of Classification Search
CPC .................. H04N 19/00654; H04N 19/00678
USPC ............................................. 375/240.01–241
See application file for complete search history.

(56) References Cited

U.S. PATENT DOCUMENTS

| | | | | |
|---|---|---|---|---|
| 5,617,144 A * | 4/1997 | Lee | | 375/240.16 |
| 5,936,673 A * | 8/1999 | Agarwal | | 375/240.24 |
| 6,968,012 B1 * | 11/2005 | Meggers | | 375/240.24 |
| 7,697,610 B2 * | 4/2010 | Yu et al. | | 375/240.16 |
| 2003/0156644 A1 * | 8/2003 | Song et al. | | 375/240.13 |
| 2005/0129122 A1 * | 6/2005 | Booth et al. | | 375/240.16 |
| 2006/0056719 A1 * | 3/2006 | Yu et al. | | 382/239 |
| 2006/0164543 A1 * | 7/2006 | Richardson et al. | | 348/390.1 |
| 2007/0106759 A1 * | 5/2007 | Willie et al. | | 709/219 |
| 2007/0268964 A1 * | 11/2007 | Zhao | | 375/240.1 |
| 2008/0152006 A1 * | 6/2008 | Chen et al. | | 375/240.13 |
| 2008/0253463 A1 * | 10/2008 | Lin et al. | | 375/240.25 |
| 2009/0046779 A1 * | 2/2009 | Seok et al. | | 375/240.03 |
| 2010/0027663 A1 * | 2/2010 | Dai et al. | | 375/240.16 |
| 2010/0061448 A1 * | 3/2010 | Zhou et al. | | 375/240.03 |
| 2010/0195733 A1 * | 8/2010 | Yan et al. | | 375/240.16 |
| 2010/0215106 A1 * | 8/2010 | Au et al. | | 375/240.16 |
| 2011/0051806 A1 | 3/2011 | Lee | | |
| 2011/0051809 A1 | 3/2011 | Lee | | |

(Continued)

OTHER PUBLICATIONS

ISO/IEC 14496-14, Information technology—Coding of audio-visual objects—Part 14: MP4 file format, Nov. 15, 2003, 18 Pages.*

(Continued)

*Primary Examiner* — Ayaz Sheikh
*Assistant Examiner* — Mounir Moutaouakil
(74) *Attorney, Agent, or Firm* — Joshua D. Isenberg; JDI Patent

(57) ABSTRACT

Fast motion estimation in video encoding may be implemented using early termination. One or more section sizes in a current video picture may be determined for which a portion of motion estimation can be skipped during encoding of the current video picture. The portion of motion estimation may be performed on the current video picture on a section-by-section basis only for one or more section sizes not skipped. The picture may be encoded using the motion estimation performed in b) to produce an encoded picture. The resulting encoded picture may be stored or transmitted. The speedup achieved by skipping part of motion estimation may be regulated by selection of a quality control value.

22 Claims, 11 Drawing Sheets

(56) References Cited

U.S. PATENT DOCUMENTS

2011/0051811 A1    3/2011  Wang et al.
2011/0246603 A1*   10/2011 Lee .............................. 709/217
2011/0255589 A1*   10/2011 Saunders et al. ......... 375/240.01

OTHER PUBLICATIONS

ISO/IEC 14496-14, Information technology—Coding of audio-visual objects—Part 15: AVC File format, Apr. 15, 2004, 29 Pages.*

ISO/IEC 14496-12:2005 Information technology—Coding of audio-visual objects—Part12: ISO base media file format, Oct. 15, 2008, 120 pages.*

Cell Broadband Engine Architecture, Copyright International Business Machines Corporation, Sony Computer Entertainment Incorporated, Toshiba Corporation, 2005; Available online at http://www-306.ibm.com/chips/techlib/techlib.nsf/techdocs/1AEEE1270EA2776387257060006E61BA/$file/CBEA_01_pub.pdf.

* cited by examiner

UTILIZING THRESHOLDS AND EARLY TERMINATION TO ACHIEVE FAST MOTION ESTIMATION IN A VIDEO ENCODER

CROSS REFERENCE TO RELATED APPLICATIONS

This application is related to commonly-assigned co-pending U.S. patent application Ser. No. 12/553,070, which is filed the same day as the present application and entitled "PICTURE-LEVEL RATE CONTROL FOR VIDEO ENCODING" U.S. Patent Application Publication Number US 2011/0051806), the entire contents of which are incorporated herein by reference.

This application is related to commonly-assigned co-pending U.S. patent application Ser. No. 12/553,069, which is filed the same day as the present application and entitled "SCENE CHANGE DETECTION" U.S. Patent Application Publication Number US 2011/0051809), the entire contents of which are incorporated herein by reference.

This application is related to commonly-assigned co-pending U.S. patent application Ser. No. 12/553,074, which is filed the same day as the present application and entitled "PARALLEL DIGITAL PICTURE ENCODING" U.S. Patent Application Publication Number US 2011/0051811), the entire contents of which are incorporated herein by reference.

FIELD OF THE INVENTION

Embodiments of the invention are related to motion estimation in a video encoder and more specifically to reducing the complexity of any two-phase motion estimation process.

BACKGROUND OF THE INVENTION

Digital signal compression using a coder/decoder (codec) allows streaming media, such as audio or video signals to be transmitted over the Internet or stored on CDs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

Motion estimation (ME) is the most computationally intensive process of video encoding. It involves determining a motion vector (e.g., spatial difference) between a current section of a video frame and a reference section of either the same video frame picture or another video frame picture. These motion vectors are then used in the process of encoding the video stream or decoding the video stream. The motion estimation process allows for sections of a given video picture to be encoded with only a reference to a similar section, either in the current video picture or a prior video picture, and a motion vector describing the spatial transformation of the current section from a reference section. This thereby eliminates the need to encode entire sections when prior sections depicting very similar imagery have already been encoded. The H.264 standard allows seven different block sizes or sections in dividing a given video frame picture (16×16, 16×8, 8×16, 8×8, 8×4, 4×8, and 4×4), which makes the variable block size motion estimation a bottleneck in the encoding process.

It is within this context that embodiments of the current invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
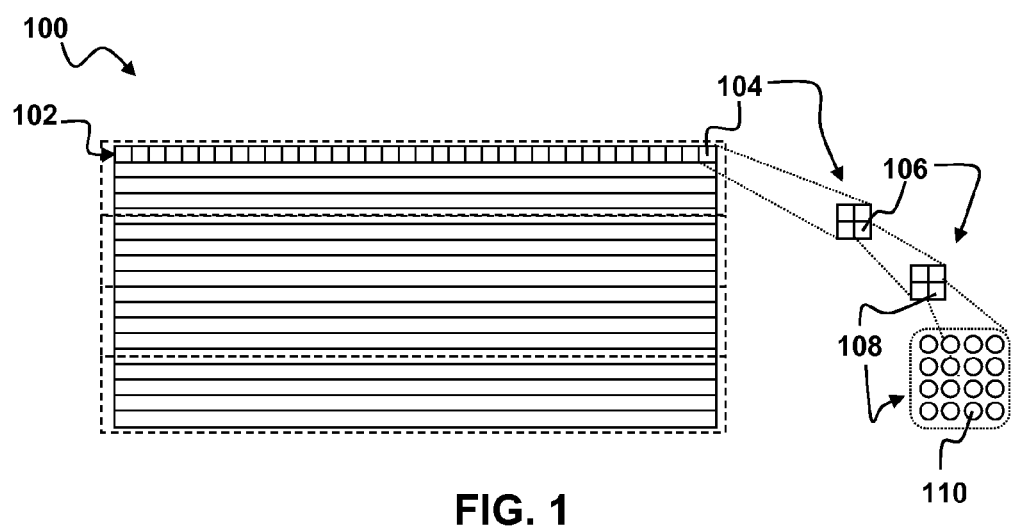
FIG. 1 is a schematic diagram illustrating one possible division of a video picture for encoding.

FIG. 1 depicts how a single digital picture 100 (e.g., a frame of digital video) may be broken down into one or more sections. As used herein, the term "section" refers to a group of one or more pixels within a picture. A section can range from a single pixel within the picture, up to the whole picture. Non-limiting examples of sections include slices 102, macroblocks 104, sub-macroblocks 106, blocks 108, and individual pixels 110. The number of macroblocks 104 in a row depends on the size of the macroblocks and the size and resolution of the picture. For example, if each macroblock contains 16×16 pixels, then the number of macroblocks in each row may be determined by dividing the width of the picture (in pixels) by 16. Each macroblock 104 may be broken down into a number of sub-macroblocks 106. Each sub-macroblock 106 may be broken down into a number of blocks 108, and each block 108 may contain a number of pixels 110. By way of example, and without limitation of the invention, in a common video encoding scheme, each macroblock 104 may be broken down into 4 sub-macroblocks 106. Each sub-macroblock 106 may be broken down into four blocks 108, and each block may contain a 4×4 arrangement of sixteen pixels 110.

Figure 2:
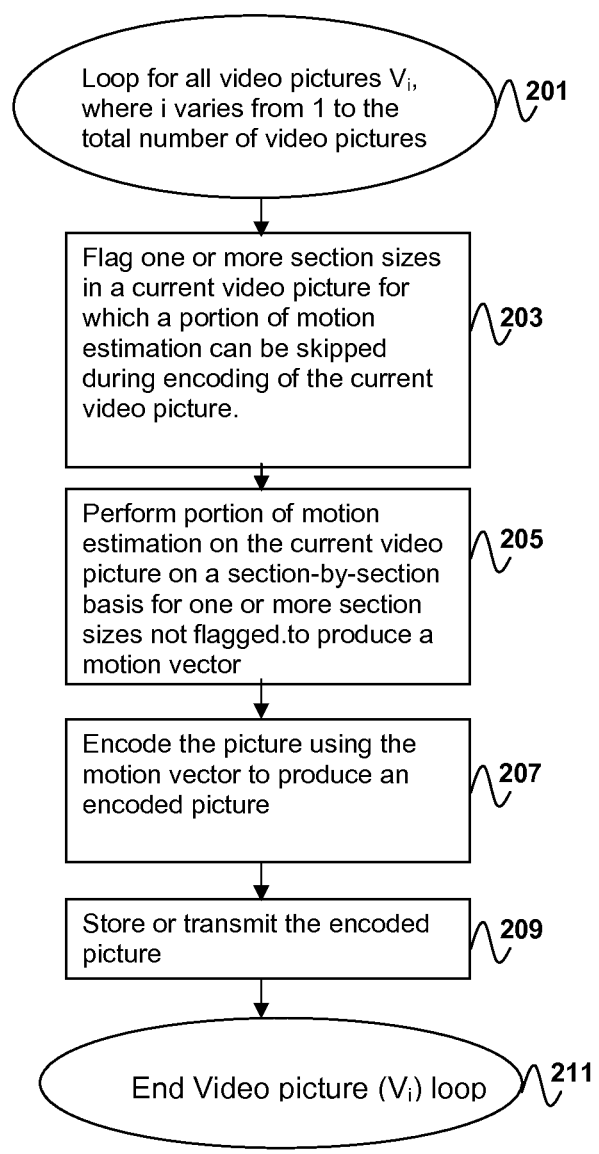
FIG. 2 is a flow diagram illustrating an example of a method for early termination of motion estimation computations in video encoding according to an embodiment of the present invention.

FIG. 2 is a flow diagram depicting a general method for fast motion estimation in digital picture encoding. The method illustrated in FIG. 2 utilizes thresholds and early termination to achieve fast motion estimation in a video encoder. For each video picture, a set of processes is run in order to efficiently encode the picture for storage or transmission. These processes may be run for each video picture of the video stream, until all video pictures are encoded as indicated at 201. First, a determination is made of one or more section sizes in a current video picture for which a portion of the motion estimation can be skipped during the encoding of the current video picture. Section sizes that can be skipped are flagged as indicated at 203. The section sizes that are to be skipped may be flagged before continuing on to the next step. There are a number of different ways to determine the section sizes for which part of the motion estimation may be skipped. Three examples are discussed below with respect to FIGS. 3A-6.

In some embodiments, the determination and flagging process at 203 may flag all section sizes that are less than or equal to some maximum section size for which part of the motion estimation can be skipped. In such embodiments, the determination and flagging process 203 may start by analyzing a largest section size for which motion estimation is normally performed (e.g., a 16×16 pixel marcoblock) and work downward to smaller and smaller section sizes (e.g., 16×8, 8×16, 8×8, etc.) until it is determined that part of the motion estimation can be skipped for some section size. At this point that section size, and all smaller section sizes, may be flagged and analysis of the smaller section sizes need not be done.

In some alternative embodiments, the determination and flagging process at 203 may analyze all section sizes for which motion estimation is normally performed and flag those section sizes for which part of the motion estimation can be skipped.

Motion Estimation (ME) is divided into two stages in many implementations. The first stage or ME Fast (ME phase 1) is a process that yields an approximate motion vector (MV) using relatively few computations. Exhaustive motion search is not performed in this stage of motion estimation. While determining this MV, certain distortion metrics, e.g. sum of absolute differences (SAD) or sum of absolute transformed differences (SATD) are computed. Values of these distortion metrics may be used in the algorithms described below to eliminate ME computations in the second stage of motion estimation (ME phase 2). This second stage, which yields the final motion vector, is computationally intensive, and may involve an exhaustive motion search. By comparing quantities derived from the distortion metrics determined in ME phase 1 to certain threshold values one can determine whether the more computationally intensive second stage of motion estimation may be skipped for certain section sizes within a picture. These section sizes can be flagged so that ME phase 2 skips these section sizes.

The flagging of section sizes to skip may be determined on a section-by-section basis within the picture. By way of example, the determination may be made on a macroblock-by-macroblock basis if the distortion values differ for each macroblock.

After the flagging process has been completed for a given video picture, the portion of motion estimation may be performed on the current video picture on a section-by-section basis for one or more section sizes that are not flagged as indicated at 205. Flagged section sizes may be skipped. By way of example, and without limitation of the invention, if it is determined that phase 2 motion estimation for a section size of 8×8 in some part of the current video picture may be skipped, then phase 2 motion estimation will only need to be run on section sizes 16×16, 16×8, and 8×16, skipping over section sizes of 8×8, 8×4, 4×8, and 4×4 for that part of the picture. This speeds up the process of motion estimation by eliminating computations for section sizes which would not end up as the best match in the motion estimation process.

Once motion estimation of the video picture has been performed, the video picture may be encoded using the motion estimation as indicated at 207. Standard video encoding may be implemented, e.g., according to any suitable encoding standard, e.g., the AVC (H.264) standard. Finally, after a video picture has been encoded, it may then be stored (e.g., on a hard disk, video disk) or transmitted (e.g., via computer network or over-the-air broadcast stream) as indicated at 209. By way of example, and without limitation to the invention, transmission of a video picture may be accomplished over the Internet, through digital broadcasting, or through any other multi-user network as indicated at 211.

Figure 3A:
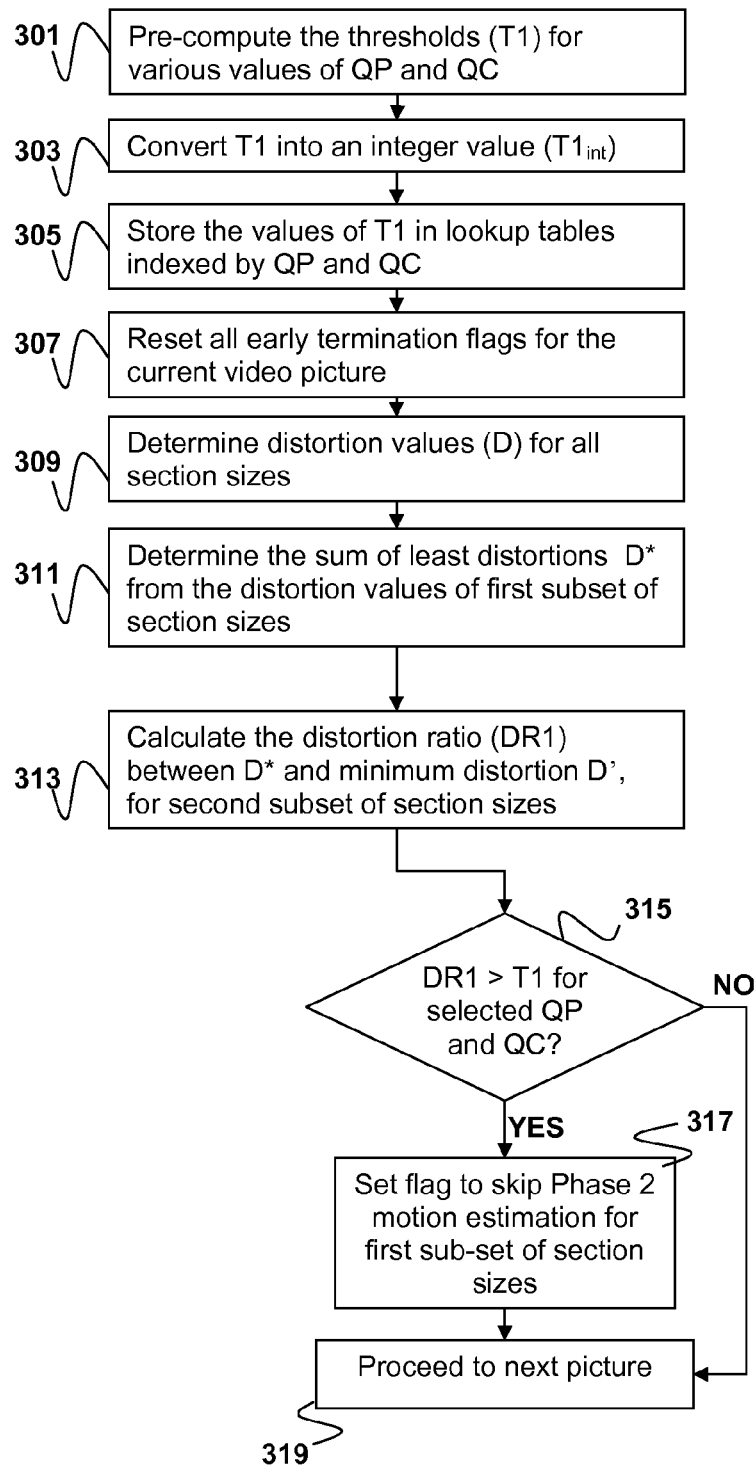
FIGS. 3A-3B are flow diagrams illustrating a first example of a method for determining one or more section sizes in a current video picture for which a portion of motion estimation can be skipped during encoding of the current video picture according to an embodiment of the present invention.

FIG. 3A is a flow diagram illustrating an example of a method for determining one or more section sizes in a current video picture for which motion estimation can be skipped during the encoding of the current video picture as described above. In the example illustrated in FIG. 3A, an algorithm may be used to eliminate part of the motion estimation for section sizes of 8×8, 8×4, 4×8, and 4×4 pixels. In other examples, the algorithm may also eliminate part of the motion estimation for 16×8 and 8×16 section sizes.

The first step of the method illustrated in FIG. 3A involves pre-computing threshold values (T1) for various values of quantization parameter (QP) and quality control (QC) value as indicated at 301. The QP value is a setting used by many codecs, such as H.264 to control the quality of video compression. The QC value is a number between 0 and 100, which may be used to control the picture quality of the encoded bit stream. A lower QC value would result in a lower picture quality, but would result in faster encoding, as a larger number of section sizes are skipped during the motion estimation process. Similarly, a higher value of QC would cause fewer section sizes to be skipped during motion estimation, thereby resulting in a higher picture quality at the cost of a lower speedup in motion estimation. Any T1 value for any combination of QP and QC may be determined by analyzing several test sequences (e.g., different QP and QC values) and utilizing curve fitting.

The QC value may be selected at the beginning of the encoding process depending on the application. For example, if the video is being encoded for a high-quality target such as Blu-Ray movie authoring, where picture quality is more important than encoding time, a high QC value may be selected. For applications where encoding time has a higher significance that picture quality, a low QC value may be selected.

It is noted that the concept of quality control (QC) value is not part of any standard. While the quantization parameter (QP) is defined in standards, QC is a configuration setting that may be implemented at an encoder to control the performance of the encoder. By way of example, and not by way of limitation, the range of QC may be from 0 to 100, but it could be some other range too. The ability of the algorithms described herein to use the QC value to control the amount of speedup it generates is an important feature.

By way of example, and not by way of limitation, the T1 values may be predetermined from test video sequences. FIG. 3C illustrates an example of a method by which the threshold values T1 may be computed from test video sequences. A test suite containing several video sequences may be created, as indicated at 341. The encoder used in conjunction with the early termination algorithm may be used to encode the test sequences for all QP over some predetermined range as indicated at 343. By way of example, the predetermined range may be from 0 to 51. During the encoding process, (specifically during ME phase 1), distortion ratios may be determined for all macroblocks as indicated at 345. The distortion ratio calculation may depend on the specifics of the early termination algorithm that is eventually used. Two different examples of distortion ratios, referred to as DR1 and DR2 are discussed below. Using statistical analysis, quantiles may be calculated for the distortion ratio data as indicated at 347. A quantile divides the distortion ratio data into some number q which would divide the data sample into q equal observations. By way of example, if q=100 the quantiles are conventionally referred to as percentiles and the data set is divided into 100 equal observations. The Nth quantile value may be used as the threshold for a QC value of N as indicated at 349 in a data table that associates a threshold value with corresponding QC and QP values. The threshold values determined from the quantiles for various values of QP and QC may be plotted as indicated at 351. 2D surface fitting techniques may be used as indicated at 353 to eliminate outliers and reduce the table size if required. Once the T1 values are determined, they may be converted into an integer value T1, by using the formula: $T1_{int}=(T1)*65536$ as described at 303. By converting the T1 value into an integer, floating point computations may be avoided. Once all T1 values have been converted into integers, the integer values $T1_{int}$ may be stored in lookup tables indexed by QP and QC as indicated at 305.

After a lookup table for $T1_{int}$ has been created for values corresponding to various QP and QC values, the flagging process for a given video picture may begin. First, all early termination flags for the current video picture may be reset as indicated at 307. Next, the video picture may be traversed to determine distortion values (D) for several different section sizes, e.g.: 16×16, 16×8, 8×16, 8×8, 8×4, 4×8, and 4×4 pixel sections as indicated at 309. The distortion values may be measured, e.g., using a metric like a sum of absolute differences (SAD) or a sum of absolute transformed differences (SATD). Once the distortion values have been determined, a sum of least distortions (D*) may be determined from the distortion values of a subset of the section sizes including the smallest section size, e.g., m×n=8×8, 8×4, 4×8, and 4×4 as indicated at 311.

The value of D* may be the sum of the minimum distortions for each sub-macroblock within a macroblock. For example, a 16×16 macroblock MB may contain four 8×8 sub-macroblocks SubMB[0], SubMB[1], SubMB[2], and SubMB[3]. By way of example, and not by way of limitation, the value of D* for the macroblock MB may be calculated by determining the distortion values for each sub-macroblock $D_{8\times8}$ and the distortion values for each sub-section of each sub-macroblock within MB and summing the minimums of the distortion values associated with each sub-macroblock. In the case of 8×8 sub-macroblocks, the subsections include 8×4, 4×8, and 4×4. By way of hypothetical numerical example assume the following distortion values for the sub-macroblocks and sub-sections within each sub-macroblock:

SubMB[0]: $D_{8\times8}=1$, $D_{8\times4}=2$, $D_{4\times}=3$, $D_{4\times4}=4$. In this case, the minimum distortion value for SubMB[0] would be $D_{8\times8}=1$.

SubMB[1]: $D_{8\times8}=8$, $D_{8\times4}=5$, $D_{4\times8}=6$, $D_{4\times4}=7$. In this case, the minimum distortion value for SubMB[1] would be $D_{8\times4}=5$.

SubMB[2]: $D_{8\times8}=11$, $D_{8\times4}=12$, $D_{4\times8}=9$, $D_{4\times4}=10$. In this case, the minimum distortion value for SubMB[2] would be $D_{4\times}8=9$.

SubMB[3]: $D_{8\times8}=14$, $D_{8\times4}=15$, $D_{4\times8}=16$, $D_{4\times4}=13$. In this case, the minimum distortion value for SubMB[3] would be $D_{4\times4}=13$.

Based on the foregoing distortion values the sum of least distortions D*=1+5+9+13=28 for this macroblock.

A distortion ratio (DR1) may then be calculated for each section size as indicated at 313. By way of example, DR1 can be computed for m×n=8×8 by taking the ratio between $D_{8\times8}$ and D', where D' represents the minimum distortion between a subset of section sizes including a largest section size. The value of D' may be calculated as $D'=Min(D_{16\times16}, D_{16\times8}, D_{8\times16}$ and D*), wherein $D_{16\times16}$, $D_{16\times8}$, $D_{8\times16}$ are distortion values for 16×16, 16×8 and 8×16 section sizes and D* is the sum of least distortions. In checking the early termination condition for a sub-macroblock, D' may be divided by 4 to account for the relative size of the sub-macroblock in relation to a macroblock.

At this point, a comparison between the DR1 and $T1_{int}$ is made according to the desired values of QP and QC as indicated at 315. If the DR1 value is smaller than the $T1_{int}$ value, then no section sizes are flagged, and the flagging process may continue for the next section size. If the DR1 value is greater than the $T1_{int}$ value, a flag may be set to skip phase 2 motion estimation for the section size 8×8 for the sub-macroblock being analyzed. In some embodiments, all section sizes smaller than 8×8 may also be flagged to skip phase 2 motion estimation.

Figure 3B:
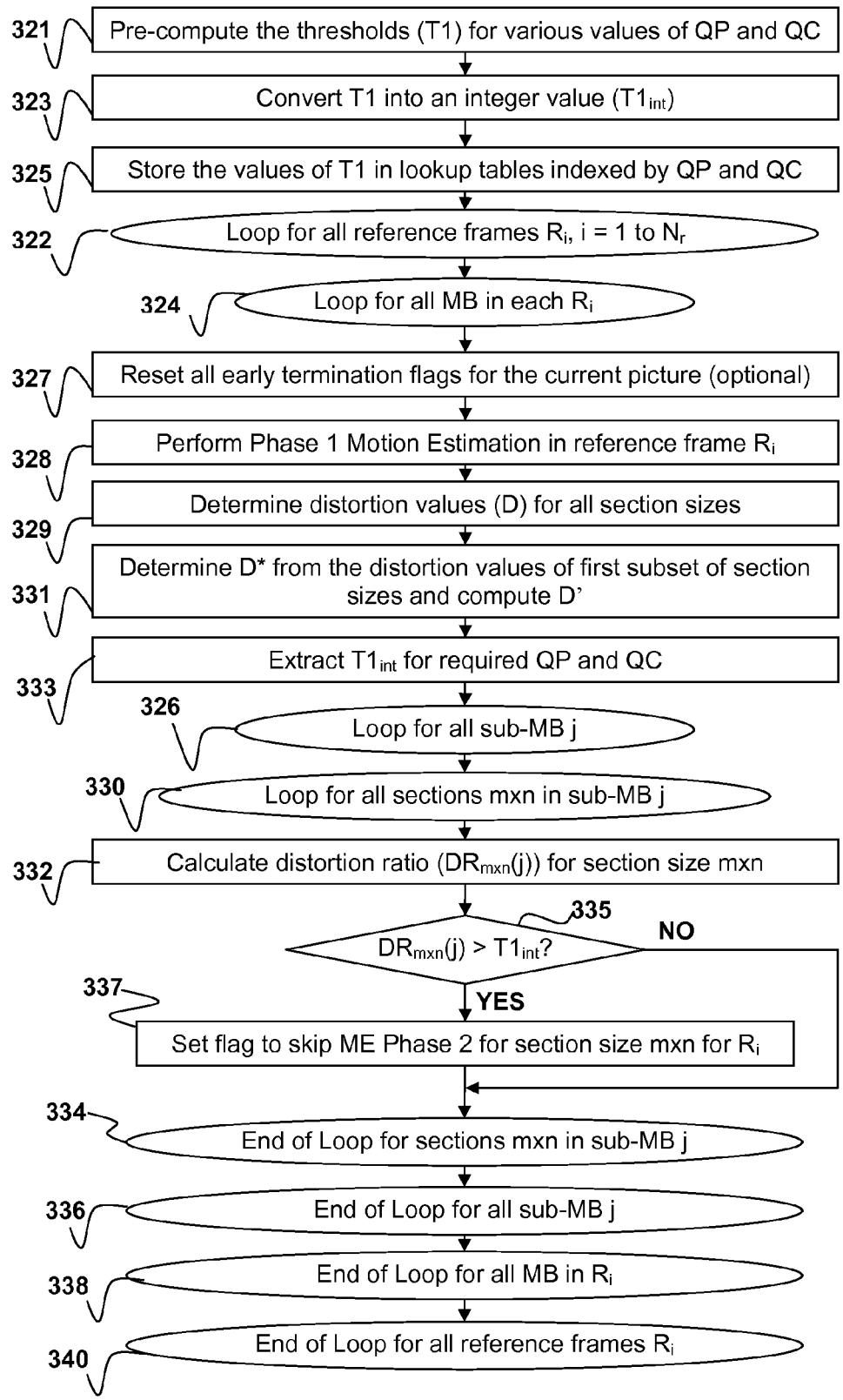
Figure 3C:
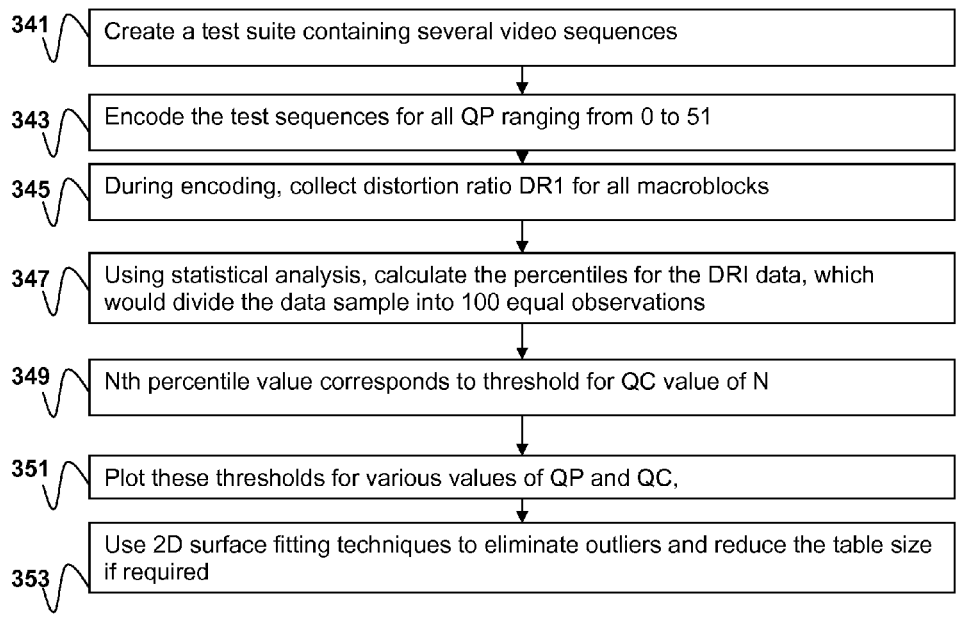
FIG. 3C is a flow diagram illustrating an example of pre-computation of thresholds for determining one or more section sizes in a current video picture for which a portion of motion estimation can be skipped during encoding of the current video picture according to an embodiment of the present invention

A more detailed example of an algorithm for implementing early termination flagging is illustrated in FIG. 3B. In this example, the thresholds T1 may be pre-computed as indicated at 321 and converted to integer values $T1_{int}$ as indicated at 323. Selected T1 values may be stored in a lookup table as indicated at 325. The early termination may be implemented as a series of nested loops. An outermost loop 322 is implemented over all reference frames $R_i$ used for motion estimation on the current picture. Within the outermost loop is a first inner loop 324 that iterates over all macroblocks MB within a given reference frame. For each macroblock MB all early termination flags may optionally be reset as indicated at 327 and phase 1 motion estimation may be performed as indicated at 328. During the course of phase 1 motion estimation distortion values $D_{m\times n}$ may be determined for all section sizes m×n within the macroblock as indicated at 329. A sum of least distortions D* and minimum distortion D' for section sizes larger than m×n may be computed as indicated at 331. By way of example, and not by way of limitation, D* and D' may be computed as described above with respect to FIG. 3A. Integer threshold values $T1_{int}$ for required values of QP and QC may then be extracted from the table, or determined by Interpolation from values in the table as indicated at 333.

At this stage a second inner loop 326 may iterate over all sub-macroblocks j within the macroblock MB and an innermost loop 330 may iterate over all sections m×n within each sub-macroblock j. Within the innermost loop, a distortion ratio $DR_{m \times n}(j)$ is calculated for each section size m×n within sub-macroblock j as indicated at 332. The distortion ratio $DR_{m \times n}(j)$ may be calculated as the ratio of $D_{m \times n}$ to D', as discussed above with respect to FIG. 3A.

The distortion ratio $DR_{m \times n}(j)$ is then compared to the integer threshold value $T1_{int}$ as indicated at 335. If $DR_{m \times n}(j)$ is greater than the integer threshold value $T1_{int}$ a flag is set to skip phase 2 motion estimation for section size m×n in macroblock MB within reference frame $R_i$ as indicated at 337. Otherwise, the innermost loop 330 iterates to the next section size in sub-macroblock j.

If the distortion ratio is calculated in this manner, subsequent calculations that use the distortion ratio may need to use floating point computations. The need for floating point computations may be eliminated, e.g., the distortion ratio $DR_{m \times n}$ may be compared to $T1_{int}$ using a formula that avoids the need for floating point computations, e.g., using a formula, such as $D_{m \times n}[j] \ast 65536 > T1_{int} \ast (D'/4)$.

Once the innermost loop 330 is finished with all section sizes within sub-macroblock j innermost loop ends, as indicated at 334 and the second inner loop 326 iterates to the next sub-macroblock in macroblock MB. Once the second inner loop 326 is finished with all sub-macroblocks j in macroblock MB, the second inner loop 326 ends, as indicated at 336 and the first inner loop 324 iterates to the next macroblock in reference frame R. Once the first inner loop 324 is finished with all macroblocks in reference frame $R_i$, the first inner loop 324 ends, as indicated at 338 and the outermost loop iterates to the next reference frame. Once the outmost loop 322 is finished with all reference frames $R_i$ the outermost loop 322 ends as indicated at 340.

After flagging the appropriate section sizes, motion estimation may be performed on section sizes where the flag has not been set. This motion estimation may then be incorporated into the encoding process as described above.

Figure 4A:
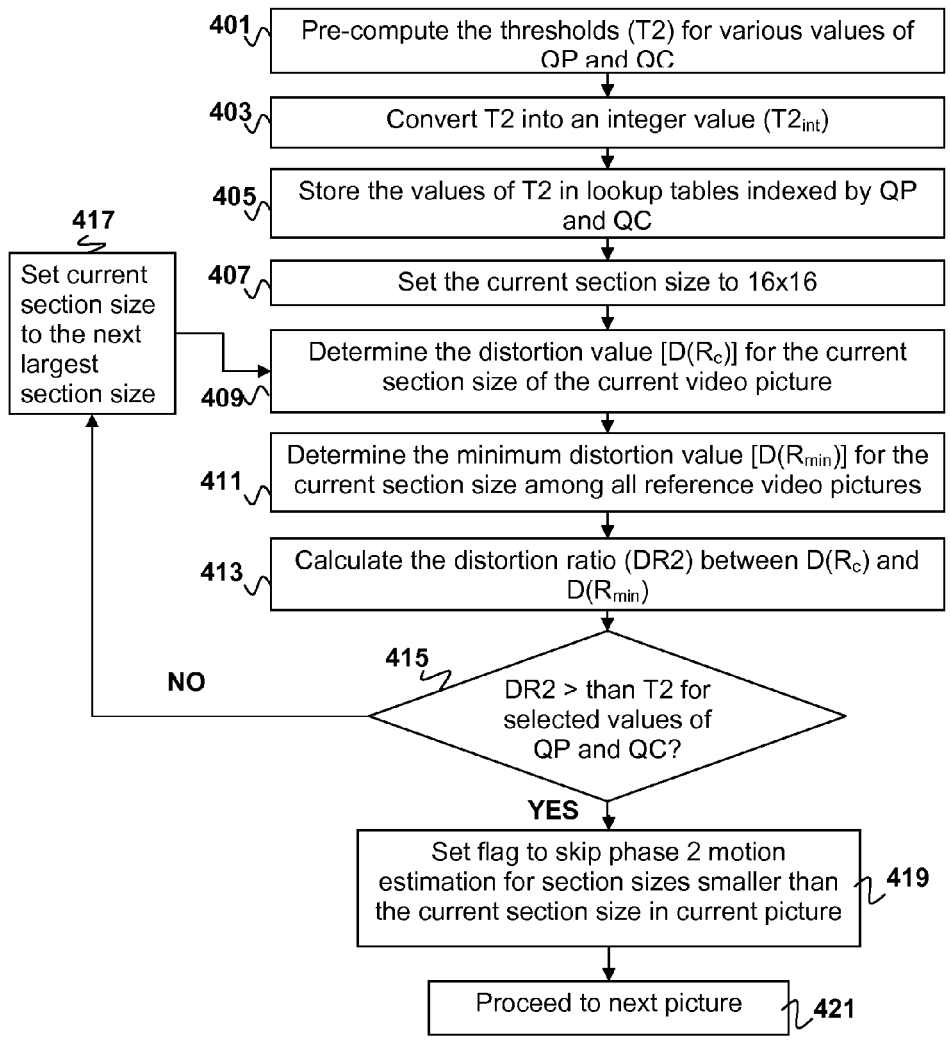
FIGS. 4A-4B are flow diagrams illustrating a second example of a method for determining one or more section sizes in a current video picture for which a portion of motion estimation can be skipped during encoding of the current video picture according to an embodiment of the present invention.

FIG. 4A is a flow diagram describing a second method for determining one or more section sizes in a current video picture for which motion estimation can be skipped during the encoding of the current video picture as described above. The algorithm in this example may be used to eliminate motion estimation for all section sizes including a largest section size, e.g., 16×16 pixels. The first step involves precomputing threshold values (T2) for various values of QP and QC as indicated at 401. Any T2 value for any combination of QP and QC may be determined by analyzing several test sequences (e.g., different QP and QC values) and utilizing curve fitting, e.g., as described above with respect to FIG. 3C.

Once the T2 values are determined, they may optionally be converted to corresponding integer values $T2_{int}$, e.g., by using the formula: $T2_{int}=(T2) \ast 65536$ as described at 403. By converting the T2 values to integers floating point computations may be avoided. Once, all T2 values have been converted into integers, resulting values of $T2_{int}$ may be stored in lookup tables indexed by QP and QC as indicated at 405.

The number of $T2_{int}$ values stored may be limited by available memory. For example, if QP varies from 0 to 51, and QC varies from 0 to 100, a table that indexes each value of QP and QC to a $T2_{int}$ value may be impractically large. If a sufficiently large memory is not available, we the threshold values for only a few cases of QP may be stored in the table and the remaining threshold values may be derived using interpolation. By way of example, and not by way of limitation in one implementation, T2 and/or $T2_{int}$ values may be stored for only four values of QP.

In general, the section sizes that can be skipped may be selected based on encoding requirements. Some section sizes may not be selected, e.g., if the speedup achieved by skipping the size would be low and negative effect on the picture quality would be high. For example, the flagging process may begin by setting the current section size to be evaluated to 16×16 as indicated at 407. The distortion value $[D(R_c)]$ for the current section size of the current video picture may then be determined as indicated at 409. Initially, a $D(R_c)$ value would be determined for a section size of 16×16 in the current video picture. Next, a minimum distortion value $[D(R_{min})]$ may be determined for the current section size among all reference pictures as indicated at 411. In other words, the $D(R_{min})$ value may be determined for 16×16 section sizes amongst all reference pictures. Once $D(R_c)$ and $D(R_{min})$ are determined, a distortion ratio DR2 may be calculated as described at 413. The DR2 value may be calculated by taking the ratio of $D(R_c)$ to $D(R_{min})$.

At this point, a comparison between the DR2 and T2 may be made according to the desired values of QP and QC as indicated at 415. If DR2 is greater than T2, a flag is set to skip motion estimation for this particular section size, (e.g., 16×16) as indicated at 417. Then the current section size is set to be one section size smaller than the previous section size (e.g., from 16×16 to 16×8), and the flagging process is restarted for the new current section size as described at 419. The steps for determining $D(R_c)$ and $D(R_{min})$ values, as well as the steps for calculating DR2 and determining a flag are repeated for all relevant section sizes (e.g., sections ranging from 16×16 to 4×4).

By way of example, distortion ratios DR2 for section sizes 8×8, 8×4, 4×8 and 4×4, may be calculated for each sub-macroblock as the ratio of the distortion of the sub-macroblock to the minimum distortion of the corresponding sub-macroblocks among all reference frames. If DR2 for a given sub-macroblock is larger than T2, the corresponding sub-macroblock for that particular section size is flagged.

Once the flagging process is complete for a given picture the process may proceed to the next picture as indicated at 421.

Figure 4B:
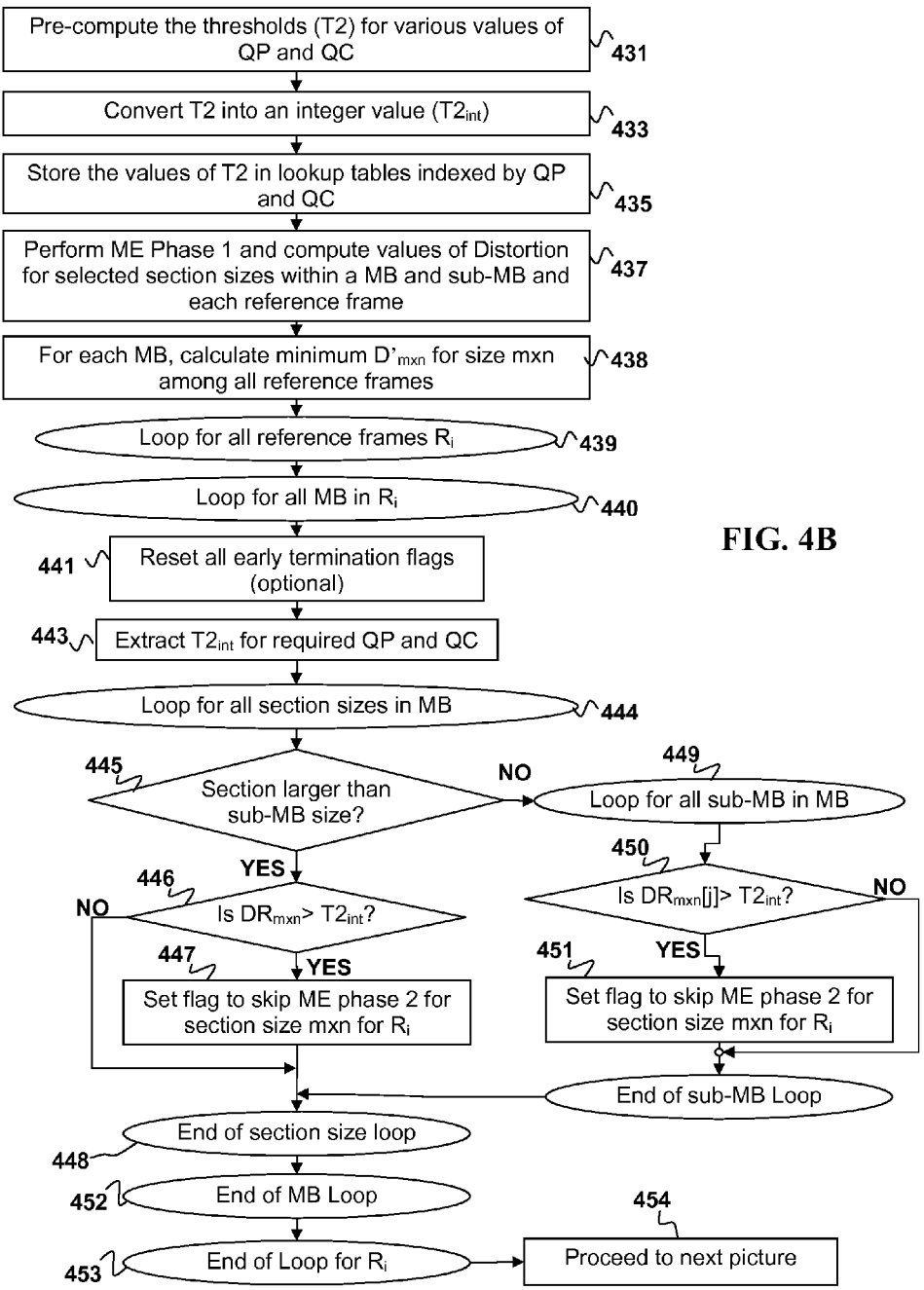

FIG. 4B illustrates a more detailed example of an algorithm for implementing early termination flagging of the type described above with respect to FIG. 4A. In the embodiment depicted in FIG. 4A, early termination thresholds T2 are computed for various values of QP and QC, as indicated at 431. The T2 values may optionally be converted to integer values $T2_{int}$, as indicated at 433 and stored as indicated at 435. Phase 1 motion estimation computations may be performed and distortion values $D_{m \times n}$ may be computed for section sizes within each macroblock that are larger than a sub-macroblock and for sub-macroblock and smaller section sizes for each sub-macroblock within the macroblock for each reference frame as indicated at 437. A minimum distortion $D'_{m \times n}$ may be calculated for each section size m×n among all reference frames, as indicated at 438.

Once the minimum distortion values $D'_{m \times n}$ are calculated, flagging of the sections may be implemented by a series of nested loops. An reference frame loop 439 iterates over all reference frames $R_i$ used for motion estimation for the current picture. Within the reference frame loop 439 is a macroblock loop 440 that iterates over all macroblocks MB within a given reference frame $R_i$. In the macroblock loop 440, all early termination flags for a macroblock MB may optionally be reset, as indicated at 441. It is noted that the resetting of early termination flags is applicable where a single method of early termination determination is implemented. In some embodiments, multiple methods of early termination may be used simultaneously. If multiple methods are simultaneously used, resetting the flags may discard the results of some of the other methods.

The T2 or T2$_{int}$ value for the required QP and QC values for the macroblock MB may be extracted, as indicated at 443. The T2 or T2$_{int}$ value may be extracted from a lookup table, e.g., by direct lookup or by computation using an interpolation based on QP, QC and T2 values stored in the lookup table. Once the T2 or T2$_{int}$ values have been extracted a loop section size loop 444 may iterate over all section sizes in the macroblock. Within the section size loop, flagging is slightly different for section sizes that are larger than a sub-macroblock and those that are sub-macroblock size and smaller. Specifically, if, at 445, the section size m×n is determined to be larger than a sub-macroblock, a distortion ratio DR$_{m \times n}$ for the section size m×n for the current reference frame is compared to the threshold value TR2 or TR2$_{int}$ as indicated at 446. The distortion ratio DR$_{m \times n}$ is a ratio of the distortion D$_{m \times n}$ for section size m×n of marcoblock MB for the current reference frame to the minimum distortion D'$_{m \times n}$ for the current section size among all reference frames. By way of example, the distortion ratio comparison may be performed by multiplying D$_{m \times n}$ by 65536 to convert it to an integer and comparing the resulting number to the product of T2$_{int}$ and D'$_{m \times n}$. In this example, the comparison at 446 may therefore be computed according to a formula such as D$_{m \times n}$*65536>T2$_{int}$*D'$_{m \times n}$ that avoids the use of floating point computations. If, at 446 DR$_{m \times n}$ is determined to be greater than T2$_{int}$ the flag may be set to skip phase 2 motion estimation for section size m×n for reference frame R$_i$, as indicated at 447. Otherwise, the section size loop 444 iterates to the next section size.

If, at 445, the section size is not larger than a sub-macroblock, a sub-macroblock loop 449 within the section size loop 444 may iterate over all sub-macroblocks j within the macroblock MB. A distortion ratio DR$_{m \times n}$ [j] for section size m×n within sub-macroblock j of macroblock MB for the current reference frame is compared to the threshold value TR2 or TR2$_{int}$ as indicated at 450. The distortion ratio DR$_{m \times n}$ [j] is a ratio of the distortion D$_{m \times n}$ [j] for section size m×n for the current reference frame to the minimum distortion D'$_{m \times n}$ for the current section size among all sub-macroblocks within macroblock MB for the current reference frame. By way of example, the distortion ratio comparison may be performed, e.g., by multiplying D$_{m \times n}$ [j] by 65536 to convert it to an integer and comparing the resulting number to the product of T2$_{int}$ and D'$_{m \times n}$. In this example, the comparison at 450 may therefore be implemented according to D$_{m \times n}$[j] *65536>T2$_{int}$*D'$_{m \times n}$, as discussed above.

If, at 450 DR$_{m \times n}$[j] is determined to be greater than T2, the flag may be set to skip phase 2 motion estimation for section size m×n of sub-macroblock j of macroblock MB for reference frame R, as indicated at 451. Otherwise, the sub-macroblock loop 449 iterates to the next sub-macroblock in macroblock MB. Once flagging is complete for all sections within macroblock MB for the current reference frame, the section size loop 444 ends, as indicated at 448 and the macroblock loop 440 iterates to the next macroblock for the current reference frame. Once the macroblock loop 440 is completed for all macroblocks for the current reference frame, the macroblock loop 440 ends, as indicated at 452 and the reference frame loop 439 iterates to the next reference frame. Once the reference frame loop 453 is finished at 453 the process may be repeated for the next picture to be encoded, as indicated at 454.

Figure 5:
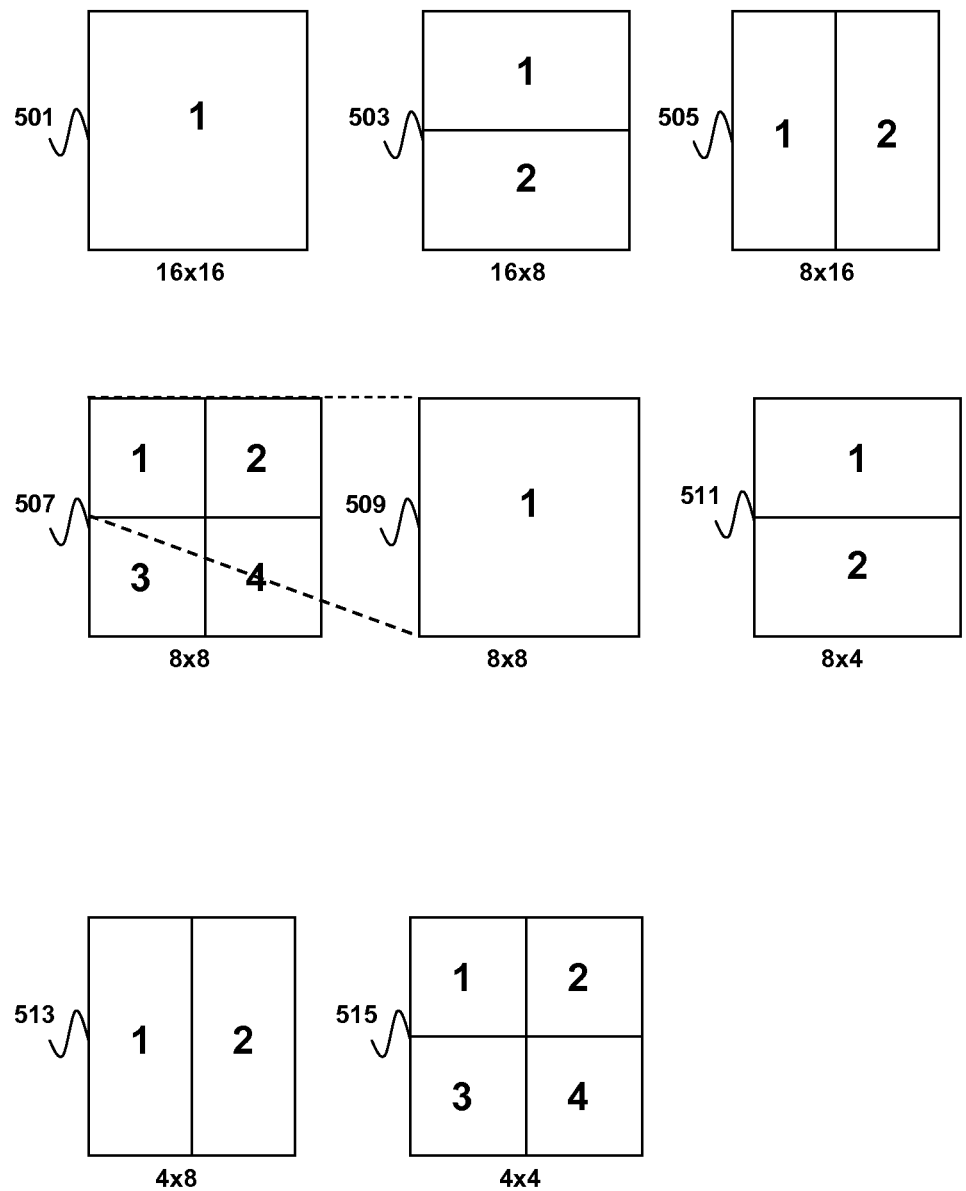
FIG. 5 is a schematic diagram illustrating an example of subdivision of sections of a digital picture.

A third method for determining one or more section sizes in a current video picture for which motion estimation can be skipped during the encoding of the current video picture is also available. FIG. 5 describes the partition of section sizes in accordance with this particular method. By way of example, and not by way of limitation, a 16×16 pixel section 501 may be partitioned into two 16×8 pixel sections 503, two 8×16 pixel sections 505, or four 8×8 pixel sections 507. An 8×8 section 509 may be further partitioned into two 8×4 sections 511, two 4×8 sections 513, or four 4×4 sections 515.

According to a third method for determining one or more section sizes in a current video picture for which motion estimation can be skipped during the encoding of the current video picture a motion vector may be determined for a larger section size (e.g., a 16×16 pixel macroblock). This motion vector may then be compared to motion vectors for the next smaller sized sub-sections within the larger section (e.g., 8×16 or 16×8). If the motion vectors are the same then the motion compensation may be skipped for the sub-section sizes for which motion vectors match and for smaller section sizes. The process may be repeated comparing motion vectors for the sub-sections to motion vectors for sub-sub-sections. This process may repeat iteratively for smaller and smaller section sizes.

Figure 6:
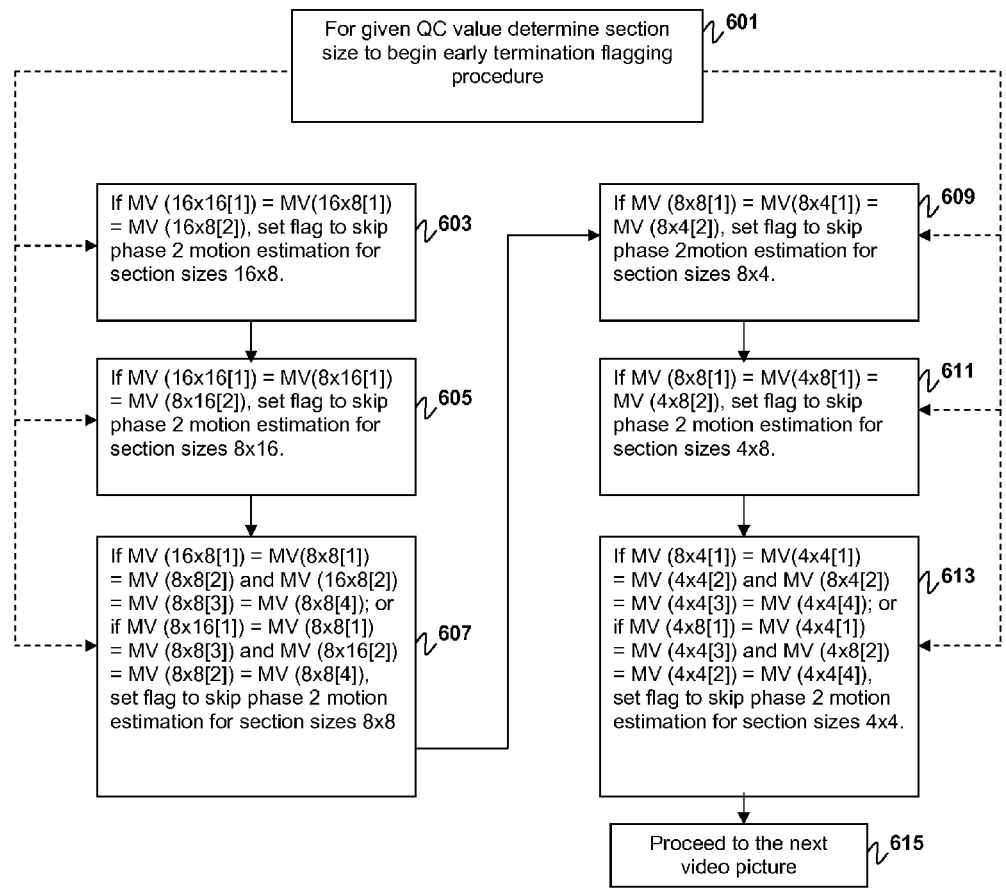
FIG. 6 is a flow diagram illustrating a third example of a method for determining one or more section sizes in a current video picture for which a portion of motion estimation can be skipped during encoding of the current video picture according to an embodiment of the present invention.

By way of example, the flow diagram shown in FIG. 6 illustrates an example wherein the third method is used to eliminate motion estimation for all section sizes except a largest section size, e.g., 16×16. For a given QC value, a section size smaller than the largest section size (e.g., ranging from 16×8 to 4×4) is determined to begin the early termination flagging procedure, as indicated at 601. By way of example, for a section size beginning at 16×8, the motion vector of section size 16×16 may be compared to the motion vector of section size 16×8 partition 1 and partition 2 as indicated at 603. If it is determined that these values are equivalent, then a flag may be set to skip motion estimation for section size 16×8. Then the section size may be changed to the next section size, e.g., 8×16, and the motion vector of section size 16×16 may be compared to the motion vectors of section size 8×16 partition 1 and partition 2 as indicated at 605. If the motion vectors are equivalent, then a flag may be set to skip motion estimation for section sizes 8×16 in encoding the current video picture. Then the section size may be lowered to the next lowest size, e.g., 8×8.

At this point, the motion vector of section size 16×8 partition 1 may be compared to the motion vectors of section size 8×8 partition 1 and partition 2 and the motion vector of section size 16×8 partition 2 may be compared to the motion vectors of section size 8×8 partition 3 and partition 4 as indicated at 607. If these motion vectors are equivalent, then a flag may be set to skip motion estimation for section size 8×8. If these motion vectors are not equivalent, then the motion vector of section size 8×16 partition 1 may be compared to the motion vectors of section size 8×8 partition 1 and partition 3 and the motion vector of section size 8×16 partition 2 may be compared to the motion vectors of section size 8×8 partition 2 and partition 4 as described at 607. If these motion vectors are equivalent, then a flag may be set to skip motion estimation for section size 8×8. Then the section size may be lowered to the next lowest size, e.g., 8×4.

The motion vector of section size 8×8 may be compared to the motion vectors of section size 8×4 partition 1 and partition 2 as indicated at 609. If these motion vectors are equivalent, then a flag is set to skip motion estimation for section size 8×4 for the current sub-macroblock of the current video picture. Then the section size may be lowered to the next lowest size, e.g., 4×8 and the motion vector of section size 8×8 may be compared to the motion vectors of section size 4×8 partition 1 and partition 2 as indicated at 611. If these motion vectors are equivalent, then a flag may be set to skip motion estimation for section size 4×8 for the current sub-macroblock of the current video picture. Then the section size may be lowered to the next lowest section size, e.g., 4×4.

The motion vector of sections size 8×4 partition 1 may be compared to the motion vectors of section size 4×4 partition 1 and partition 2, and the motion vector of section size 8×4 partition 2 may be compared to the motion vectors of section size 4×4 partition 3 and partition 4 as indicated at 613. If these motion vectors are equivalent, then a flag may be set to skip motion estimation for section sizes 4×4 and smaller for the current video picture. If these motion vectors are not equivalent then the motion vector section size 4×8 partition 1 may be compared to the motion vectors of section size 4×4 partition 1 and partition 3, and the motion vector section size 4×8 partition 2 may be compared to the motion vectors of section size 4×4 partition 2 and partition 4 as indicated at 613. If these motion vectors are equivalent, then a flag may be set to skip motion estimation for section sizes 4×4 for the current sub-macroblock of the current video picture. If, however, these motion vectors are not equivalent, then no flag may be set, and the early termination/flagging process proceeds for the next picture as indicated at 615.

It is important to note that the starting section size for this early termination process may begin at any section size smaller than the largest section size, e.g., ranging from 16×8 to 4×4 depending on the QC value desired.

The motion vector and early termination conditions may be determined on a macroblock by macroblock basis for sections larger than a sub-macroblock (e.g., 8×8). For section sizes 8×8 and smaller, the motion vector and early termination conditions may be checked for each sub-macroblock in a macroblock.

Figure 7:
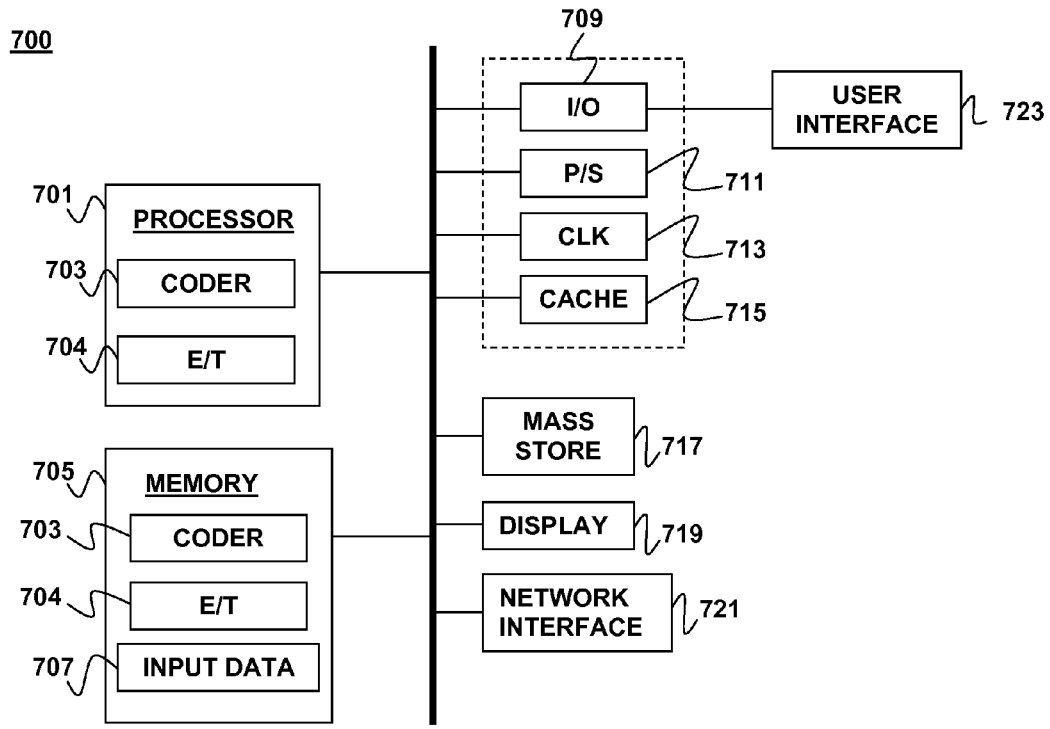
FIG. 7 is a block diagram illustrating an apparatus for implementing early termination of motion estimation in encoding digital pictures according to an embodiment of the present invention.

FIG. 7 illustrates a block diagram of a computer apparatus 700 that may be used to achieve fast motion estimation in video encoding as described above. The apparatus 700 generally includes a processor module 701 and a memory 705. The processor module 701 may include one or more processor cores. An example of a processing system that uses multiple processor modules is a cell processor, examples of which are described in detail, e.g., in Cell Broadband Engine Architecture, which is available online, and which is incorporated herein by reference.

The memory 705 may be in the form of an integrated circuit, e.g., RAM, DRAM, ROM, and the like. In some embodiments, the processor module 701 may have local memories associated with each core. A coder program 703 may be stored in the main memory 705 in the form of processor readable instructions that can be executed on the processor module 701. The coder program 703 may be configured to encode a picture into compressed signal data and/or to decode compressed signal data. By way of example, and not by way of limitation, the coder program 703 may be configured as described in commonly-assigned co-pending patent application publication number 20090010338, the contents of which are incorporated herein by reference in their entirety. The encoder program 703 may implement digital picture encoding according to any suitable encoding standard.

The encoder program 703 may include or operate in conjunction with an early termination (E/T) program 704, which may be stored in the main memory 705 in the form of processor readable instructions that can be executed on the processor modules 701. The E/T program 704 may be configured to determine one or more section sizes in a video picture for which motion estimation can be skipped during the encoding of the video picture as described above. The E/T program 704 may be written in any suitable processor readable language, e.g. C, C++, JAVA, Assembly, MATLAB, FORTRAN, and a number of other languages. Input data 707 may also be stored in the memory 705. Such input data 707 may include buffered portions of streaming data, e.g., video pictures or portions thereof. During the execution of the E/T program 704, portions of program code and/or data 707 representing one or more digital pictures may be loaded into the memory 705 on the local stores of processor cores for parallel processing by multiple processor cores.

The E/T program 704 may include instructions that when executed by the processor 701 implement a method for determining one or more section sizes in a current video picture for which motion estimation can be skipped during the encoding of the current video picture. The encoder program 703 may be configured to skip these section sizes during encoding.

The apparatus 700 may also include well-known support functions, such as input/output (I/O) elements 709, power supplies 711, a clock (CLK) 713, and cache 715. The apparatus 600 may optionally include a mass storage device 717 such as a disk drive, CD-ROM drive, tape drive, or the like to store programs and/or data. The apparatus 700 may optionally include a display unit 719 and user interface unit 723 to facilitate interaction between the apparatus 700 and a user. The display unit 719 may be in the form of a cathode ray tube (CRT) or flat panel screen that displays text, numerals, and graphical symbols on images. The user interface 723 may include a keyboard, mouse, joystick, light pen, or other device that may be used in conjunction with a graphical user interface (GUI). The apparatus 700 may also include a network interface 721 to enable the device 700 to communicate with other devices over a network, such as the internet. These components may be implemented in hardware, software, or firmware or some combination of two or more of these.

Figure 8:
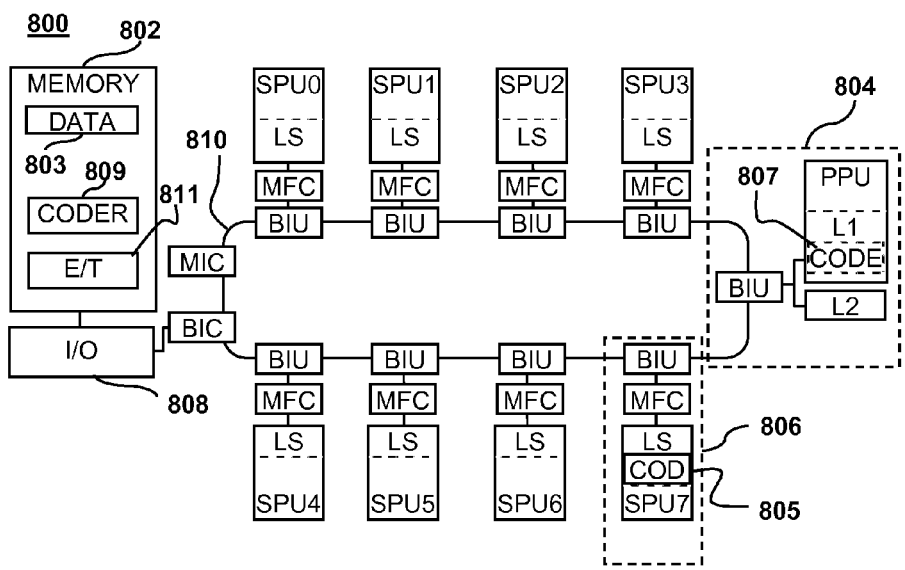
FIG. 8 is a block diagram illustrating an example of a cell processor implementation of an apparatus for implementing early termination of motion estimation in encoding digital pictures according to an embodiment of the present invention.
Figure 9:
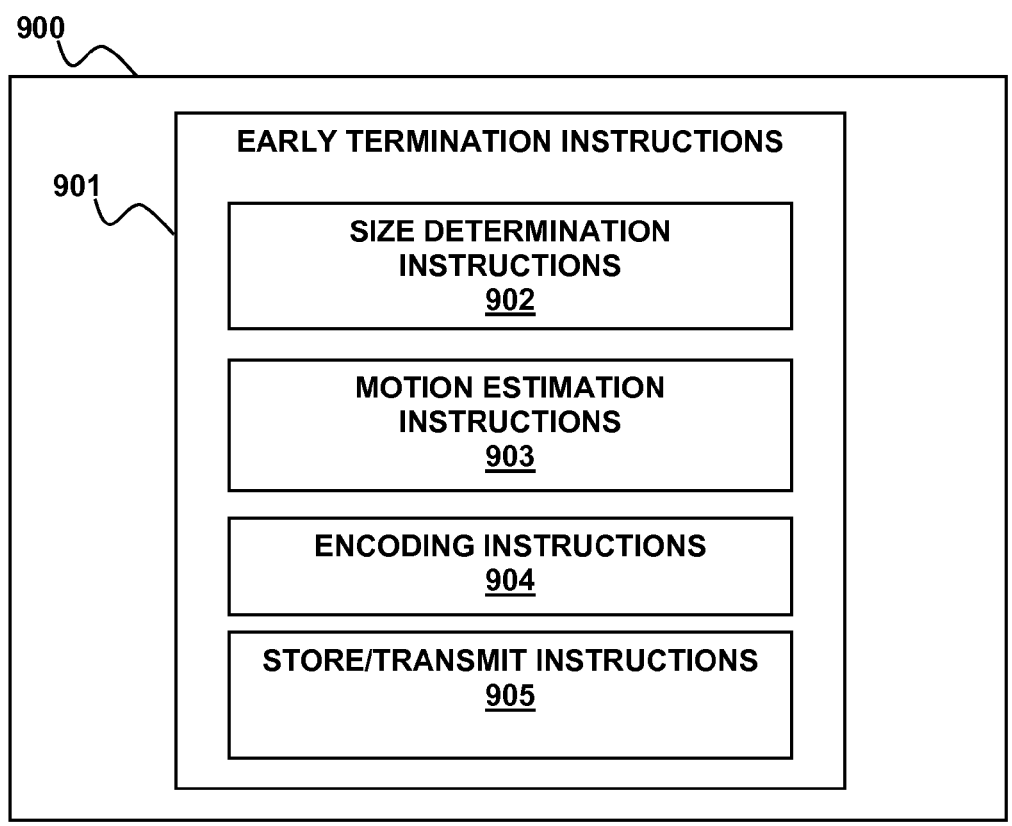
FIG. 9 is a block diagram of a computer readable medium containing computer readable instructions for implementing early termination of motion estimation in encoding digital pictures in accordance with an embodiment of the present invention.

One example, among others of a processing system capable of implementing parallel processing on three or more processors is a cell processor. There are a number of different processor architectures that may be categorized as cell processors. By way of example, and without limitation, FIG. 8 illustrates a type of cell processor 800. The cell processor 800 includes a main memory 802, a single power processor element (PPE) 804 and eight synergistic processor elements (SPE) 806. Alternatively, the cell processor 800 may be configured with any number of SPEs. With respect to FIG. 8, the memory 802, PPE 804, and SPEs 806 can communicate with each other and with an I/O device 808 over a ring-type element interconnect bus 810. The memory 802 may contain input data 803 having features in common with the input data 707 described above, a coder program 809 having features in common with the coder program 703 described above, and an early termination program 811 having features in common with the early termination program 704 described above. At least one of the SPE 806 may include in its local store (LS) early termination instructions 805 and/or a portion of the buffered input data that is to be processed in parallel, e.g., as described above. The PPE may include in its L1 cache, code instructions 807 having features in common with the coder program 803 described above. Instructions 805 and data 807 may also be stored in memory 802 for access by the SPE and PPE when needed.

By way of example the PPE 804 may be 64-bit PowerPC Processor Unit (PPU) with associated caches. The PPE 804 may include an optional vector multimedia extension unit. Each SPE 806 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 800 to implement applications that require a higher computational unit density and can effectively use the provided instruction set. A significant number of SPUs 806 in a system, managed by the PPE 804, allows for cost-effective processing over a wide range of applications. By way of example, the cell processor 800 may be characterized by an architecture known as Cell Broadband engine architecture (CBEA). In CBEA-compliant architecture, multiple Peps may be combined into a PPE group and multiple SPEs may be combined into an SPE group. For the purposes of example, the cell processor 800 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online, and which is incorporated herein by reference.

Embodiments of the invention provide systems and methods for parallel scene-change detection and encoding of streaming data, such as streaming video. Such embodiments may be applied to most video encoders, in particular, H.264/AVC decoders and, more particularly, to products that have video decoder as a module. Examples of such products include but are not limited to video game consoles, DVD players, software (PC) video decoder/player, video on cell phones, and the like. In alternative embodiments, such systems and methods may be applied to decoding of streaming data other than video. Examples of such embodiments include systems and methods for decoding streaming audio data, graphic rendering streams, still picture and XML documents. Embodiments of the present invention may be desirable for various applications recording a video game, streaming game images to a portable game device and uploading and sharing game results with multiple game systems connected via a network.

As noted above, embodiments of the invention may be implemented by modifying existing video coding standards to allow for scene change detection prior to compression and encoding of a given picture in a series of video pictures. Although examples have been described above in terms of scene change detection in encoding video images, one may alternatively utilize embodiments of the present invention for encoding still pictures, e.g., in JPEG.

According to another embodiment, instructions for carrying out scene change detection in conjunction with image encoding as described above may be stored in a computer readable storage medium. By way of example, and not by way of limitation, FIG. 8 illustrates an example of a computer-readable storage medium 900. The storage medium contains computer-readable instructions stored in a format that can be retrieved interpreted by a computer processing device. By way of example, and not by way of limitation, the computer-readable storage medium 900 may be a computer-readable memory, such as random access memory (RAM) or read only memory (ROM), a computer readable storage disk for a fixed disk drive (e.g., a hard disk drive), or a removable disk drive. In addition, the computer-readable storage medium 900 may be a flash memory device, a computer-readable tape, a CD-ROM, a DVD-ROM, a Blu-ray, HD-DVD, UMD, or other optical storage medium.

The storage medium 900 contains early termination instructions 901 configured to implement early termination of motion compensation in encoding of one or more digital pictures. The early termination instructions 901 may include one or more section size determination instructions 902 that implement determination of one or more section sizes in a current video picture for which motion estimation can be skipped during encoding of the current video picture. The size determination instructions 902 may be implemented as described above with respect to FIG. 3, FIG. 4 or FIGS. 5-6. In addition the early termination instructions 901 may include one or more motion estimation instructions 903 that are configured to perform motion estimation on the current video picture on a section-by-section basis only for one or more section sizes that are larger than a maximum section size that can be skipped as determined by the size determination instructions.

Furthermore, the early termination instructions 901 may include one or more encoding instructions 904 that are configured to implement encoding of the picture using the motion estimation performed by the motion estimation instructions to produce an encoded picture. In addition, the early termination instructions 901 may include one or more difference storage/transmission instructions 905 configured to store or transmit the encoded picture.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for fast motion estimation in video encoding, comprising:
   a) determining one or more section sizes in a current video picture for which a portion of motion estimation can be skipped during encoding of the current video picture, wherein the determining the one or more section sizes is based on a pre-computed threshold value, wherein the pre-computed threshold value corresponds to a preselected quantization parameter (QP) and a preselected quality control (QC) value, wherein the QC value controls a number of the section sizes that can be skipped;
   b) performing the portion of motion estimation on the current video picture on a section-by-section basis only for one or more section sizes that cannot be skipped and skipping the portion of motion estimation for one or more different section sizes for which the portion of motion estimation can be skipped;
   c) encoding the picture using the motion estimation performed in b) to produce an encoded picture; and
   d) storing or transmitting the encoded picture.

2. A method for fast motion estimation in video encoding, comprising:

a) determining one or more section sizes in a current video picture for which a portion of motion estimation can be skipped during encoding of the current video picture;
b) performing the portion of motion estimation on the current video picture on a section-by-section basis only for one or more section sizes that cannot be skipped and skipping the portion of motion estimation for one or more different section sizes for which the portion of motion estimation can be skipped;
c) encoding the picture using the motion estimation performed in b) to produce an encoded picture; and
d) storing or transmitting the encoded picture,
wherein a) includes:
determining a distortion value for a plurality of section sizes;
calculating a sum of least distortion using the distortion values for a first subset of the plurality of section sizes, wherein the first subset includes a smallest section size;
calculating a distortion ratio between the sum of least distortion and a minimum distortion value for a second subset of the plurality, wherein the second subset includes a largest section size;
determining a threshold value related to a quantization parameter (QP) and a quality control (QC) value associated with a particular image quality desired; and
determining one or more section sizes for which the portion of motion estimation can be skipped during encoding of the current video picture by comparing the distortion ratio to the threshold value.

3. The method of claim 2, wherein a) includes performing a first phase of motion estimation on the current video picture and determining the one or more section sizes for which the portion of motion estimation can be skipped during the first phase of motion estimation, wherein the portion of motion estimation is a second phase of the motion estimation.

4. The method of claim 3 wherein the second phase of motion estimation is a refinement stage.

5. The method of claim 4, wherein comparing the distortion ratio to the threshold includes use of a formula that avoids floating point computation.

6. The method of claim 2, wherein determining the threshold value includes extracting the threshold value from a lookup table having a plurality of threshold values indexed against corresponding QP and QC values.

7. The method of claim 6, wherein extracting the threshold value includes interpolating the threshold values indexed against corresponding QP and QC values to calculate a threshold value for a combination of QP and QC values not in the table.

8. The method of claim 6, wherein the threshold values in the table are predetermined from one or more test video sequences.

9. The method of claim 8 wherein the threshold values in the table are predetermined by encoding the test sequences for a plurality QP values over a predetermined range; determining distortion ratios for all macroblocks in the test sequences; calculating quantiles for the distortion ratios; and assigning an Nth quantile value as the threshold for a QC value of N for a given QP value.

10. The method of claim 2, wherein comparing the distortion ratio to the threshold value includes use of a formula that avoids floating point computation.

11. The method of claim 2 wherein the plurality of section sizes includes 16×16, 16×8, 8×16, 8×8, 8×4, 4×8, and 4×4 pixel section sizes.

12. The method of claim 11 wherein the first subset includes the 8×8, 8×4, 4×8, and 4×4 pixel section sizes and the second subset includes the 16×16, 16×8, 8×16.

13. A method for fast motion estimation in video encoding, comprising:
a) determining one or more section sizes in a current video picture for which a portion of motion estimation can be skipped during encoding of the current video picture;
b) performing the portion of motion estimation on the current video picture on a section-by-section basis only for one or more section sizes that cannot be skipped and skipping the portion of motion estimation for one or more different section sizes for which the portion of motion estimation can be skipped;
c) encoding the picture using the motion estimation performed in b) to produce an encoded picture; and
d) storing or transmitting the encoded picture,
wherein a) includes:
i) determining a distortion value for a section size of the current video picture;
ii) determining a minimum distortion value for a section size among one or more reference video pictures;
iii) calculating a distortion ratio between the distortion value for a section size of the current video picture and the minimum distortion value for a section size among one or more reference video pictures;
iv) determining a threshold value related to a quantization parameter (QP) and a quality control (QC) value in accordance with a particular image quality desired;
v) determining whether the portion of motion estimation can be skipped for a section size during encoding of the current video picture by comparing the distortion ratio to the threshold value; and
repeating steps i) through v) for a smaller section size of the current video picture until a section size is determined to be capable of being skipped or no smaller section sizes exist.

14. A method for fast motion estimation in video encoding, comprising:
a) determining one or more section sizes in a current video picture for which a portion of motion estimation can be skipped during encoding of the current video picture;
b) performing the portion of motion estimation on the current video picture on a section-by-section basis only for one or more section sizes that cannot be skipped and skipping the portion of motion estimation for one or more different section sizes for which the portion of motion estimation can be skipped;
c) encoding the picture using the motion estimation performed in b) to produce an encoded picture; and
d) storing or transmitting the encoded picture,
wherein a) includes
i) determining a motion vector for a section size of the current video picture;
ii) determining a motion vector for one or more partitions of the section size of the current video picture;
iii) determining whether the portion of motion estimation can be skipped for a section size during the encoding of the current video picture by comparing the motion vector of the section size of the current video picture and the motion vectors for the one or more partitions of the section size of the current video picture; and
iv) repeating steps i) through iii) for a smaller section size of the current video picture until no smaller section sizes exist.

15. A system for detecting a scene change in encoding one or more digital pictures, comprising:

a processor;

a memory coupled to the processor;

instructions embodied in the memory and executable by the processor, wherein the instructions are configured to implement a method for fast motion estimation in encoding one or more digital pictures upon execution by the processor, the method comprising:

a) determining one or more section sizes in a current video picture for which a portion of motion estimation can be skipped during encoding of the current video picture, wherein the determining the one or more section sizes is based on a pre-computed threshold value, wherein the pre-computed threshold value corresponds to a preselected quantization parameter (QP) and a preselected quality control (QC) value, wherein the QC value controls a number of the section sizes that can be skipped;

b) performing the portion of motion estimation on the current video picture on a section-by-section basis only for one or more section sizes that cannot be skipped and skipping the portion of motion estimation for one or more different section sizes for which the portion of motion estimation can be skipped;

c) encoding the picture using the motion estimation performed in b) to produce an encoded picture; and d) storing or transmitting the encoded picture.

16. A system for detecting a scene change in encoding one or more digital pictures, comprising:

a processor;

a memory coupled to the processor;

instructions embodied in the memory and executable by the processor, wherein the instructions are configured to implement a method for fast motion estimation in encoding one or more digital pictures upon execution by the processor, the method comprising:

a) determining one or more section sizes in a current video picture for which a portion of motion estimation can be skipped during encoding of the current video picture;

b) performing the portion of motion estimation on the current video picture on a section-by-section basis only for one or more section sizes that cannot be skipped and skipping the portion of motion estimation for one or more different section sizes for which the portion of motion estimation can be skipped;

c) encoding the picture using the motion estimation performed in b) to produce an encoded picture; and d) storing or transmitting the encoded picture, wherein a) includes:

determining a distortion value for a plurality of section sizes;

calculating a sum of least distortion using the distortion values for a first subset of the plurality of section sizes, wherein the first subset includes a smallest section size;

calculating a distortion ratio between the sum of least distortion and a minimum distortion value for a second subset of the plurality, wherein the second subset includes a largest section size;

determining a threshold value related to a quantization parameter (QP) and a quality control (QC) value in accordance with a particular image quality desired; and determining one or more section sizes for which the portion of motion estimation can be skipped during encoding of the current video picture by comparing the distortion ratio to the threshold value.

17. A system for detecting a scene change in encoding one or more digital pictures, comprising:

a processor;

a memory coupled to the processor;

instructions embodied in the memory and executable by the processor, wherein the instructions are configured to implement a method for fast motion estimation in encoding one or more digital pictures upon execution by the processor, the method comprising:

a) determining one or more section sizes in a current video picture for which a portion of motion estimation can be skipped during encoding of the current video picture;

b) performing the portion of motion estimation on the current video picture on a section-by-section basis only for one or more section sizes that cannot be skipped and skipping the portion of motion estimation for one or more different section sizes for which the portion of motion estimation can be skipped;

c) encoding the picture using the motion estimation performed in b) to produce an encoded picture; and d) storing or transmitting the encoded picture, wherein a) includes:

i) determining a distortion value for a section size of the current video picture;

ii) determining a minimum distortion value for a section size among one or more reference video pictures;

iii) calculating a distortion ratio between the distortion value for a section size of the current video picture and the minimum distortion value for a section size among one or more reference video pictures iv) determining a threshold value related to a quantization parameter (QP) and a quality control (QC) value in accordance with a particular image quality desired;

v) determining whether the portion of motion estimation can be skipped for a section size during encoding of the current video picture by comparing the distortion ratio to the threshold value; and repeating steps i) through v) for a smaller section size of the current video picture until a section size is determined to be capable of being skipped or no smaller section sizes exist.

18. A system for detecting a scene change in encoding one or more digital pictures, comprising:

a processor;

a memory coupled to the processor;

instructions embodied in the memory and executable by the processor, wherein the instructions are configured to implement a method for fast motion estimation in encoding one or more digital pictures upon execution by the processor, the method comprising:

a) determining one or more section sizes in a current video picture for which a portion of motion estimation can be skipped during encoding of the current video picture;

b) performing the portion of motion estimation on the current video picture on a section-by-section basis only for one or more section sizes that cannot be skipped and skipping the portion of motion estimation for one or more different section sizes for which the portion of motion estimation can be skipped;

c) encoding the picture using the motion estimation performed in b) to produce an encoded picture; and d) storing or transmitting the encoded picture, wherein a) includes i) determining a motion vector for a section size of the current video picture;

ii) determining a motion vector for one or more partitions of the section size of the current video picture;

iii) determining whether the portion of motion estimation can be skipped for a section size during the encoding of the current video picture by comparing the motion vector of the section size of the current video picture and the motion vectors for the one or more partitions of the section size of the current video picture; and iv) repeating steps i) through iii) for a smaller section size of the current video picture until a section size is determined to be capable of being skipped or no smaller section sizes exist.

19. A non-transitory computer-readable storage medium having executable computer program instructions embodied therein, wherein the computer program instructions are configured, when executed, to:

a) determine one or more section sizes in a current video picture for which a portion of motion estimation can be skipped during encoding of the current video picture, wherein the determine the one or more section sizes is based on a pre-computed threshold value, wherein the pre-computed threshold value corresponds to a preselected quantization parameter (QP) and a preselected quality control (QC) value, wherein the QC value controls a number of the section sizes that can be skipped;

b) perform the portion of motion estimation on the current video picture on a section-by-section basis only for one or more section sizes that cannot be skipped and skipping the portion of motion estimation for one or more different section sizes for which the portion of motion estimation can be skipped;

c) encode the picture using the motion estimation performed in b) to produce an encoded picture; and d) store or transmit the encoded picture.

20. A non-transitory computer-readable storage medium having executable computer program instructions embodied therein, wherein the computer program instructions are configured, when executed, to:

a) determine one or more section sizes in a current video picture for which a portion of motion estimation can be skipped during encoding of the current video picture;

b) perform the portion of motion estimation on the current video picture on a section-by-section basis only for one or more section sizes that cannot be skipped and skipping the portion of motion estimation for one or more different section sizes for which the portion of motion estimation can be skipped;

c) encode the picture using the motion estimation performed in b) to produce an encoded picture; and d) store or transmit the encoded picture, wherein a) includes:

determining a distortion value for a plurality of section sizes;

calculating a sum of least distortion using the distortion values for a first subset of the plurality of section sizes, wherein the first subset includes a smallest section size;

calculating a distortion ratio between the sum of least distortion and a minimum distortion value for a second subset of the plurality, wherein the second subset includes a largest section size;

determining a threshold value related to a quantization parameter (QP) and a quality control (QC) value in accordance with a particular image quality desired; and determining one or more section sizes for which the portion of motion estimation can be skipped during encoding of the current video picture by comparing the distortion ratio to the threshold value.

21. A non-transitory computer-readable storage medium having executable computer program instructions embodied therein, wherein the computer program instructions are configured, when executed, to:

a) determine one or more section sizes in a current video picture for which a portion of motion estimation can be skipped during encoding of the current video picture;

b) perform the portion of motion estimation on the current video picture on a section-by-section basis only for one or more section sizes that cannot be skipped and skipping the portion of motion estimation for one or more different section sizes for which the portion of motion estimation can be skipped;

c) encode the picture using the motion estimation performed in b) to produce an encoded picture; and d) store or transmit the encoded picture, wherein a) includes:

i) determining a distortion value for a section size of the current video picture;

ii) determining a minimum distortion value for a section size among one or more reference video pictures;

iii) calculating a distortion ratio between the distortion value for a section size of the current video picture and the minimum distortion value for a section size among one or more reference video pictures iv) determining a threshold value related to a quantization parameter (QP) and a quality control (QC) value in accordance with a particular image quality desired;

v) determining whether the portion of motion estimation can be skipped for a section size during encoding of the current video picture by comparing the distortion ratio to the threshold value; and vi) repeating steps i) through v) for a smaller section size of the current video picture until a section size is determined to be capable of being skipped or no smaller section sizes exist.

22. A non-transitory computer-readable storage medium having executable computer program instructions embodied therein, wherein the computer program instructions are configured, when executed, to:

a) determine one or more section sizes in a current video picture for which a portion of motion estimation can be skipped during encoding of the current video picture;

b) perform the portion of motion estimation on the current video picture on a section-by-section basis only for one or more section sizes that cannot be skipped and skipping the portion of motion estimation for one or more different section sizes for which the portion of motion estimation can be skipped;

c) encode the picture using the motion estimation performed in b) to produce an encoded picture; and d) store or transmit the encoded picture, wherein a) includes:

i) determining a motion vector for a section size of the current video picture;

ii) determining a motion vector for one or more partitions of the section size of the current video picture;

iii) determining whether the portion of motion estimation can be skipped for a section size during the encoding of the current video picture by comparing the motion vector of the section size of the current video picture and the motion vectors for the one or more partitions of the section size of the current video picture; and iv) repeating steps i) through iii) for a smaller section size of the current video picture until a section size is determined to be capable of being skipped or no smaller section sizes exist.

* * * * *